US00RE43172E

(19) United States
(12) Reissued Patent
Wu et al.

(10) Patent Number: US RE43,172 E
(45) Date of Reissued Patent: Feb. 14, 2012

(54) CUT RESISTANT POLYMERIC FILMS

(75) Inventors: Zongquan Wu, Akron, OH (US); Frank W. Harris, Akron, OH (US); Steven Z. D. Cheng, Akron, OH (US)

(73) Assignee: The University of Akron, Akron, OH (US)

(21) Appl. No.: 09/605,979

(22) Filed: Jun. 29, 2000

Related U.S. Patent Documents

Reissue of:
(64) Patent No.: 6,021,524
Issued: Feb. 8, 2000
Appl. No.: 09/002,011
Filed: Dec. 31, 1997

(51) Int. Cl.
*A41D 19/00* (2006.01)

(52) U.S. Cl. ..... 2/167; 2/168; 2/161.7; 428/300.7; 428/911

(58) Field of Classification Search ..... 2/167, 168, 2/161.7, 161.6, 159, 161.1, 164, 2.5, 16; 428/911, 109, 113, 295.1, 297.7, 297.4, 492, 428/297.1, 300.7, 301.4, 35.7, 35.9, 36.4
See application file for complete search history.

(56) References Cited

U.S. PATENT DOCUMENTS 3,364,059 A * 1/1968 Marzocchi ..... 428/391
3,560,294 A * 2/1971 Potkanowicz ..... 156/276
3,615,979 A * 10/1971 Davis et al. ..... 156/87
3,850,872 A * 11/1974 Marzocchi ..... 523/213
3,924,047 A * 12/1975 Ward et al. ..... 428/378
3,979,539 A * 9/1976 Jeanson ..... 428/126
4,254,012 A * 3/1981 Green ..... 524/502
4,259,112 A * 3/1981 Dolowy, Jr. et al. ..... 428/549
4,295,907 A * 10/1981 Cordts et al. ..... 264/112
4,315,964 A * 2/1982 Ozaki et al. ..... 428/182
4,338,234 A * 7/1982 Moore et al. ..... 523/206
4,426,469 A * 1/1984 Marzola et al. ..... 523/209
4,457,970 A * 7/1984 Das et al. ..... 442/173
4,526,828 A * 7/1985 Fogt et al. ..... 442/19
4,596,736 A * 6/1986 Eichhorn et al. ..... 428/215
4,732,803 A * 3/1988 Smith, Jr. ..... 428/212
4,752,527 A * 6/1988 Sanzero et al. ..... 428/391
4,779,290 A * 10/1988 Welch et al. ..... 2/161.6
4,814,373 A * 3/1989 Frankel et al. ..... 524/460
4,864,661 A * 9/1989 Gimbel ..... 2/167
4,888,829 A * 12/1989 Kleinerman et al. ..... 2/167
4,892,779 A * 1/1990 Leatherman et al. ..... 428/220
5,042,176 A * 8/1991 Rudy ..... 36/29

(Continued)

FOREIGN PATENT DOCUMENTS

GB 2181691 4/1987 ..... 2/168

(Continued)

OTHER PUBLICATIONS

Introductory Textile Science, by Marjorie Joseph, Chap. 24 "Non-woven Fabrics", CBS College Publishing 1986, pp. 256-263.*

*Primary Examiner* — Amy B Vanatta
(74) *Attorney, Agent, or Firm* — Renner Kenner Greive Bobak Taylor & Weber

(57) ABSTRACT

A polymeric film having increased cut resistance comprising a polymeric matrix having dispersed therein a plurality of cut resistance enhancing fibers. These films are preferably made into gloves, for example medical or industrial gloves.

42 Claims, 1 Drawing Sheet

U.S. PATENT DOCUMENTS 5,070,540 A * 12/1991 Bettcher et al. ..... 2/2.5
5,087,499 A * 2/1992 Sullivan ..... 428/85
5,113,532 A * 5/1992 Sutton ..... 2/167
5,130,197 A * 7/1992 Temple ..... 428/378
5,200,263 A * 4/1993 Gould et al. ..... 428/323
5,219,656 A * 6/1993 Klett et al. ..... 428/378
5,336,555 A * 8/1994 Darras et al. ..... 442/263
5,368,930 A * 11/1994 Samples ..... 428/323
5,419,014 A * 5/1995 Piantedosi ..... 15/227
5,442,815 A * 8/1995 Cordova et al. ..... 2/161.7
5,506,039 A * 4/1996 Kimura et al. ..... 428/218
5,564,127 A * 10/1996 Manne ..... 2/161.7
5,567,498 A * 10/1996 McCarter et al. ..... 428/113
5,597,649 A * 1/1997 Sandor et al. ..... 428/370
5,599,576 A * 2/1997 Opolski ..... 427/2.3
5,601,770 A * 2/1997 Maligie ..... 264/172.19
5,604,020 A * 2/1997 Fitchmun ..... 428/213
5,616,650 A * 4/1997 Becker et al. ..... 525/102
5,646,231 A * 7/1997 Marrocco, III et al. ..... 528/125
5,716,697 A * 2/1998 Meeker ..... 428/297.4
5,741,744 A * 4/1998 Fitchmun ..... 442/16
5,817,433 A * 10/1998 Darras ..... 428/408
5,910,458 A * 6/1999 Beer et al. ..... 442/367
5,935,683 A * 8/1999 Iiyama et al. ..... 428/141
6,020,057 A * 2/2000 Darras ..... 428/323
6,020,063 A * 2/2000 Riffle et al. ..... 428/357
6,048,379 A * 4/2000 Bray et al. ..... 428/546
6,080,474 A * 6/2000 Oakley et al. ..... 428/323
6,139,958 A * 10/2000 Raghupathi et al. ..... 428/392
6,818,091 B1 * 11/2004 Holland et al. ..... 156/309.6
2001/0018118 A1 * 8/2001 Muzzy et al. ..... 428/295.1

FOREIGN PATENT DOCUMENTS

JP 25377 5/1982 ..... 2/168
WO WO 92/20244 11/1992 ..... 2/161.7

* cited by examiner

CUT RESISTANT POLYMERIC FILMS

Matter enclosed in heavy brackets [ ] appears in the original patent but forms no part of this reissue specification; matter printed in italics indicates the additions made by reissue.

TECHNICAL FIELD

This invention is directed toward cut resistant polymeric films. More particularly, the present invention is directed toward cut resistant polymeric films that contain fibers for enhancing the film's cut resistance. The present invention also relates to a process for preparing the cut resistant films of the present invention, as well as cut resistant gloves.

BACKGROUND OF THE INVENTION

With the existence of AIDS, hepatitis, influenza, and other diseases that are transferable through bodily fluids, the medical community must take precautions to avoid exposure and contact with the bodily fluids of their patients. The latex gloves that are widely used by medical practitioners provide protection from these fluids; however, the provided protection is significantly decreased when the medical practitioner uses sharp instruments. Many medical professionals, such as surgeons and embalmers, must use scalpels, scissors, knives, saws and other various sharp tools. The standard latex glove does not provide adequate protection inasmuch as the latex glove, and the practitioners hand, may easily be lacerated by these instruments, thereby intimately and dangerously exposing the doctor to the patent's bodily fluids.

It is therefore desirable that surgical gloves provide protection from these sharp objects. For example, U.S. Pat. No. 5,200,263, discloses gloves that are allegedly puncture and cut resistant, and have of at least one elastomeric layer containing a plurality of flat platelets. The flat platelets are seen as being comprised of carbon steel, stainless steel, non-ferrous metals, ceramics, and crystalline materials with a plate-like nature.

Cut resistant composite yarns capable of being knitted or woven into cut resistant articles are also known as described in U.S. Pat. No. 5,597,649. The cut resistant yarn includes a high modulus fiber and a particle filled fiber prepared from a filled resin. These fibers are made into yarns by conventional methods, then wrapped around each other to create a composite yarn. Although fabrics knitted from these yarns provide protection from cuts, they do not provide protection from fluids inasmuch as fluids can easily pass through the weaves. Consequently, these gloves can only be used as a liner glove for surgical use, and a second common latex glove must be worn to prevent contact with bodily fluids.

U.S. Pat. No. 5,442,815 discloses a flexible, uncoated glove made from a layer of fibrous material adhered to a surface of a latex glove without being fully encapsulated thereby.

Although thicker gloves, or gloves made of materials such as metal mesh, may provide more adequate protection from cuts, they do not provide the wearer with a great degree of tactile sensitivity or flexibility. These features are highly desirable when working with dangerous instruments in an environment that demands precision. Thus, there is a need in the art for cut resistant elastomeric films and more particularly for flexible, tactile sensitive, cut resistant gloves made from these films.

SUMMARY OF INVENTION

It is therefore, an object of the present invention to provide a cut resistant polymeric film.

It is another object of the present invention to provide a flexible, lightweight, tactile sensitive, cut resistant surgical glove.

It is yet another object of the present invention to provide a process for preparing a cut resistant elastomeric film.

It is still another object of the present invention to provide a process for preparing a flexible, lightweight, tactile sensitive, cut resistant surgical glove.

At least one or more of the foregoing objects, together with the advantages thereof over the known art relating to gloves and polymeric and elastomeric films, which shall become apparent from the specification that follows, are accomplished by the invention as hereinafter described and claimed.

In general the present invention provides a medical glove having improved cut resistance comprising a dip-formed polymeric glove having at least three elastomeric layers, wherein the middle layer contains fibers for enhancing the glove's cut resistance.

The present invention also provides a polymeric film having increased cut resistance comprising a polymeric matrix having dispersed therein a plurality of cut resistance enhancing fibers.

The present invention further includes a glove having increased cut resistance comprising at least one polymeric matrix layer having dispersed therein a plurality of cut resistance enhancing fibers.

PREFERRED EMBODIMENT FOR CARRYING OUT THE INVENTION

Figure 1:
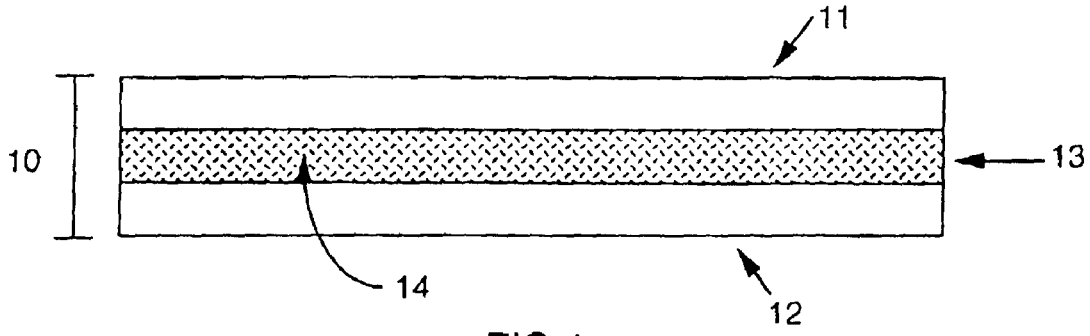
FIG. 1 is a cross-sectional view of the thickness of a medical glove according to one embodiment of the present invention.

It has now been found that cut resistance properties may be imparted to a polymeric film without substantially affecting the polymeric film's mechanical properties such as tensile strength, modulus, elongation, or weight, and also does not affect tactile sensitivity. The present invention, accordingly, is directed toward cut resistant elastomeric films; and more particularly, the preferred embodiments are directed toward cut resistant gloves including both medical and industrial gloves. Because these gloves fall within the preferred embodiment of the present invention, the remainder of the preferred embodiment will be direct toward gloves. It should be understood, however, that other elastomeric articles that exhibit cut resistant properties can be formed using the teachings of this invention, and therefore other cut resistant elastomeric articles and films are contemplated by the present invention. Also, it is here noted that the preferred embodiments of the present invention are directed toward elastomeric gloves that have been dip-formed, but it should be understood that other products that may be made according to the present invention may also be formed by other processing techniques such as melt extrusion, calendering and injection molding.

The gloves of the present invention exhibit cut resistance properties because the elastomeric matrix of the gloves contains fibers that give rise to the cut resistance properties. These fibers are preferably high tensile strength fibers or have a high degree of hardness, and are preferably uniformly dispersed throughout the elastomeric matrix of the glove. It should also be understood that the gloves of the present invention may be multi-layered, and that it has been found that cut resistance properties may be imparted to the glove when at least one layer of the glove contains at least one type of fiber. Furthermore, it is preferred, that the fibers create a three dimensional network of fibers throughout the elastomeric matrix; in other words, it is preferred that the fibers overlap each other in all three dimensions.

For purposes of this disclosure, the term cut resistance refers to an appreciable increase in protection from cuts over that provided by an elastomeric glove or film that does not contain the fibers. As those skilled in the art will recognize, cut resistance is measured by the Cut Protection Performance (CPP Test) pursuant to ASTM STP 1273. This test is a measure of the weight (load) required for a very sharp, new, weighted razor blade to slice through a film in one inch of blade travel. The weight is measured in grams and provides a relative value of the cut resistance of the film. It has surprisingly been found that gloves having at least one layer containing fibers according to the present invention have a cut resistance that is about 20 percent greater than the cut resistance of the same glove without the fibers. Preferably, the cut resistance will be improved by at least about 35 percent, more preferably will be improved by at least about 50 percent, even more preferably by at least about 100 percent, and still more preferably by at least about 150 percent, depending on the fiber content.

In one embodiment of the present invention, the gloves are medical gloves and clean room gloves. As those skilled in the art will appreciate, medical gloves include surgical gloves, examination gloves, dental gloves, and procedure gloves.

These gloves are preferably dip-formed, and are typically multi-layered. As those skilled in the art will understand, dip-formed goods are produced by dipping a mold one or more times into a solution containing a polymer or elastomer. Several applications of the mold into this solution generally forms a layer. For purposes of this disclosure, however, a layer will refer to that portion of the glove that continuously comprises the same composition of matter. Accordingly, multi-layered gloves are those gloves that include more than one compositionally distinct layer. Distinct layers can include, for example, those that contain fibers and those that do not. It is noted that these layers are considered distinct even though they may contain the same polymeric or elastomeric matrix. Generally, the medical gloves have at least one layer. Preferably, the medical gloves of the present invention include at least two layers, and even more preferably at least three layers. Where the glove is multi-layered, at least one layer will comprise fibers according to the present invention.

Any polymeric or elastomeric material that is approved for medical use may be used for each layer. These materials can be selected from natural rubber, polyurea, polyurethane, styrene-butadiene-styrene block copolymers (S-B-S), styrene-isoprene-styrene block copolymers (S-I-S), styrene-ethylene butylene-styrene block copolymer (S-EB-S), polychloroprene (neoprene), and nitrile rubber (acrylonitrile). Also useful are polymeric materials such as polyvinyl chloride and polyethylene. The foregoing elastomeric materials, however, have simply been cited as examples and are not meant to be limiting, as the skilled artisan will be able to readily select a host of elastomers that can be used.

It should be appreciated that the foregoing elastomers are dip-formed from sundry solutions. For example, natural rubber, polychloroprene, nitrile rubber, triblock copolymers such as S-I-S, S-B-S, and S-EB-S, and polyurethane are typically formulated as aqueous emulsions. The skilled artisan will readily be able to select appropriate surfactants and compounding ingredients to prepare curable latexes. The skilled artisan will also be able to mechanically process the elastomer to form a latex.

Other elastomers, such as polyurea, polyurethane, S-I-S, S-B-S, S-EB-S are typically placed into the solution using an organic solvent. Again, the skilled artisan will readily recognize, and be able to select appropriate solvents for placing these elastomers and polymers into solutions.

Many of the elastomeric and polymeric materials that are useful in the present invention are commercially available. For example, a natural rubber latex can be purchased from Killian Latex Inc. of Akron, Ohio. This latex includes accelerators, sulfur, zinc, antioxidants, and other commonly used compounding ingredients. A polyurethane latex can be purchased from B.F. Goodrich of Akron, Ohio, under the tradename SANCURE®. Also, polychloroprene can be purchased as a latex from Bayer Corporation of Houston, Tex.

Triblock copolymers such as S-I-S, S-B-S, and S-EB-S can be purchased from the Shell Chemical Company of Houston, Tex., under the tradename KRATON® G, which are S-EB-S copolymers, and KRATON® D, which are S-I-S and S-B-S copolymers. Nitrile rubber can be purchased from Bayer Corporation and polyvinyl chloride can be purchased from Geon, Inc. of Akron, Ohio under the tradename Geon 121 AR. The polyurea useful in the present invention can be made pursuant to the teachings of U.S. Pat. No. 5,264,524.

Because feel and tactile sensitivity of medical gloves is highly desirable, it is preferred that the medical gloves of the present invention have a single layer thickness that is the same or approximates the thickness of medical gloves as are known in the art. For example, the single layer thickness of the medical gloves of the present invention have a finger thickness of from about 0.08 to about 0.45 mm, and preferably from about 0.1 to about 0.25 mm; a palm thickness of from about 0.08 to about 0.4 mm, and preferably from about 0.1 to about 0.225 mm; and a cuff thickness of from about 0.08 to about 0.2, and preferably from about 0.1 to about 0.15 mm. It should be appreciated that the use of "single layer thickness" is used as herein commonly used in the art, and should not be construed in view of the definition of "layer" as defined above.

With respect to the mechanical properties of the medical gloves of the present invention, it is preferred that the properties of the gloves meet ASTM standards as defined by D 3577. Specifically, the natural latex gloves should have a tensile strength of at least about 24 MPa, preferably at least about 28 MPa, and even more preferably at least about 30 MPa; the elongation should be at least about 750 percent, preferably at least about 950 percent, and even more preferably at least about 1050 percent; and the modulus at 500 percent should be less than 5.5 MPa, preferably less than 3.5 MPa, and even more preferably less than 2.0 MPa. Regarding the synthetic gloves, the tensile strength should be at least about 17 MPa, preferably at least about 22 MPa, and even more preferably at least about 26 MPa; the elongation should be at least about 650 percent, preferably at least about 850 percent, and even more preferably at least about 1050 percent; and the modulus at 500 percent should be less than 7 MPa, preferably less than 3.5 MPa, and even more preferably less than 2.5 MPa.

As for the density of the medical gloves of the present invention, it is preferred that the gloves have a density from about 100 g/m$^2$ to about 300 g/m$^2$, preferably from about 150 g/m$^2$ to about 250 g/m$^2$, and even more preferably from about 160 g/m$^2$ to about 210 g/m$^2$.

As noted above, at least one layer of the medical gloves of the present invention contains at least one type of fiber. These fibers can be selected from glass fibers, steel fibers, aramid polymeric fibers, polyethylene polymer fibers, particle filled polymeric fibers, or polyester fibers. Those skilled in the art will recognize that other fibers that have high tensile strength or hardness can be selected and used as the cut resistance enhancing fibers in accordance with the present invention.

The glass fibers are preferably milled glass fibers and are commercially available from Owens Corning Fiberglass Corporation of Toledo, Ohio under the tradename 731 ED milled glass fiber.

The aramid fibers are commercially available from E. I. DuPont de Nemours & Company, Inc. of Wilmington, Del., under the tradename Kevlar® fibers.

The polyethylene polymeric fibers are commercially available from Allied Signal of Virginia under the tradename Specrtra® fibers. It should be understood that polyethylene fibers are preferably ultra high modulus, high molecular weight polyethylene fibers.

The particle filled polymeric fibers are commercially available from Hoechst Celanese of Charlotte, N.C., under the tradename CRF fibers. These particle filled fibers include reinforcing materials such as glass or ceramic particles. As it is understood, these fibers can also be made of a variety of different polymeric materials, including but not limited to, polyethylene and polyester. U.S. Pat. No. 5,597,649, which is incorporated herein by reference, discloses a number of such particle filled fibers.

In general, the fibers employed in the present invention have a length from about 0.1 mm to about 5.0 mm and preferably from about 0.2 mm to about 2.0 mm. In general, the denier of the fibers of the present invention is from about 1 to about 10, and preferably from about 2 to about 8. The skilled artisan will appreciate that one denier is equivalent to one gram per 9,000 meters. Because the present invention employs chopped fibers, an accurate measurement of denier must take account the number of filaments present. It should also be understood that the foregoing fibers can be spun or extruded into a number of shapes. These shapes are often a function of the spinning spinnerete or extrusion die employed. For example, fibers can be spun or extruded into a number of symmetrical and asymmetrical shapes including, but not limited to, fibers that are round, oval, flat, triangular, and rectangular.

The amount of fiber within the medical gloves of the present invention is about 2 weight percent to about 20 weight percent, based upon the entire weight of the elastomer and fiber within the entire glove. Preferably, the amount of fiber added is from about 2 weight percent to about 15 weight percent, and even more preferably from about 2 weight percent to about 10 weight percent, again based on the weight of the fiber and the elastomer.

In an especially preferred embodiment, the medical gloves of the present invention have at least three distinct layers, with the center layer or layers including at least one type of fiber. The outermost and innermost layers, therefore, do not contain fibers that increase cut resistance. This preferred embodiment is best understood with reference to FIG. 1. There, a cross-sectional view of the thickness 10 of a medical glove according to this embodiment is shown. The outermost layer 11 and innermost layer 12 do not contain any cut resistance enhancing fibers. The middle layer 13 contains a three dimensional network of fibers 14. It should be understood that each of the layers may comprise a distinct polymeric or elastomeric material, or they may be the same, and the middle layer may comprise one or several types of fibers.

In another embodiment, the gloves of the present invention are industrial gloves. In general, the industrial gloves of the present invention may be the same as the medical gloves described hereinabove. As the skilled artisan will appreciate, however, tactile sensitivity and feel are often not as crucial in industrial applications as in medical applications. To this extent, the industrial gloves of the present invention may be thicker and contain a greater amount of fiber. It should be understood, however, that the industrial gloves of the present invention can achieve the same or superior cut resistance with a thinner glove than industrial gloves known in the prior art. For example, the industrial gloves of the present invention may have a single layer thickness as thin as a medical glove, or as thick as 4 mm, or from about 0.08 to about 2 mm, or from about 1 to about 1.8 mm, depending on the end use. In fact, as the skilled artisan will appreciate, it is preferred to have a thick glove in certain applications. Or, some applications call for thin gauge gloves and the gloves of the present invention can achieve a thin gauge while maintaining cut resistance. Thus, the desired thickness may vary based upon intended use.

The amount of fiber within the industrial gloves of the present invention may be from about 10 to about 30 weight percent based upon the entire weight of the glove.

In forming the gloves of the present invention, it is particularly preferred to dip-form the gloves. Other methods, however, are also contemplated such as heat sealing and blow molding. Generally, the first step in forming the glove is to select an appropriate polymeric solution or latex for the fiber containing layer. The fibers are then added to the appropriate concentration and dispersed throughout the solution or latex. The latex or polymeric solution is continuously agitated during dip-forming. Several methods can be employed to appropriately disperse the fibers throughout the solution or latex including the use of mechanical or pneumatic apparatus. It should be appreciated that these foregoing methods are simply examples, and that the skilled artisan will be able to readily determine a number of other methods for dispersing the fibers throughout the solution.

To assist in the dispersion of the fibers, surfactants such as cationic, anionic, non-ionic or quaternary surfactants can be added to the solution. Again, the surfactants are simply noted as examples and the skilled artisan will be able to readily select a number of other surfactants that will be useful and not deleterious to the present invention. It should also be understood that the fibers may be surface treated, which thereby promotes their dispersion throughout the solution. Such surface treatments likewise include cationic, anionic, non-ionic or quaternary surface treatments. Moreover, surface treated glass fibers are available from Owens Corning Fiberglass Corporation under the tradename 731 ED milled glass fibers.

Once the polymeric solution containing the fibers is formed, a glove mold is dipped into the solution to achieve the desired thickness. Those skilled in the art will readily understand this procedure as it is commonly practiced in the art.

Where a multi-layered glove is formed, such as the three layered glove in accordance with the preferred embodiment of the present invention, a solution that does not contain fibers is also formed. The mold is first dipped one or more times into the elastomeric/polymeric solution that does not contain fibers until the desired thickness is formed. As the skilled artisan will appreciate, coagulating agents are often disposed onto a glove mold prior to applying the mold into a latex solution. These coagulating agents typically contain calcium nitrate. This layer is then allowed to dry. After the freshly dipped glove is removed from a latex solution, if required it may then be placed into a leaching bath. Once this first layer is formed, which will ultimately be the innermost layer of the glove, such as layer 12 of FIG. 1, the glove is then dipped one or more times into the solution containing the fibers in accordance with the present invention. Once a layer of sufficient thickness is achieved, the layer is then allowed to dry. The mold containing these first two layers is then repeatedly dipped into the polymeric solution that does not contain any fibers to form the third, outermost layer such as layer 11 of FIG. 1. Again, when a latex is employed, the mold may be dipped into a leaching bath after dipping the outermost layer.

Those skilled in the art will also appreciate that when latex solutions are employed, such as a natural rubber latex, it is often necessary to add other compounding ingredients in order to form a dip-formed glove. These other compounding ingredients can include, for example, zinc oxide, sulfur, antioxidants, ammonia, and a host of other ingredients as are generally known in the art.

The cut resistant films of the present invention may be useful in a number of applications in addition to their use as a glove. For example, there is a need for cut resistant films in the automotive industry in applications such as air bags or upholstery. Also, they may be used in the protective clothing industry as sleeves or leggings.

In order to demonstrate the practice of the present invention, the following examples have been prepared and tested as described in the General Experimentation Section disclosed hereinbelow. The examples should not, however, be viewed as limiting the scope of the invention. The claims will serve to define the invention.

GENERAL EXPERIMENTATION

EXAMPLE 1

A three layered polyurea glove was formed in accordance with the present invention where the middle layer contained one or more types of fibers. Physical characteristics of this glove were analyzed and compared to the physical characteristics of a similar glove that did not contain the fibers.

A solution of polyurea was formed by reacting about 17 grams of hexamethylene diisocyanate, dissolved in about 2,000 ml of dichloroethane, with about 230 grams of amine terminated butadiene-acrylonitrile copolymer, dissolved in about 1,200 ml of dichloroethane. It should be appreciated that the amine terminated butadiene-acrylonitrile copolymer is available from the BF Goodrich Company under the tradename HYCAR® ATBN. The reactants were gradually reacted over a four hour period. Because the resultant product gradually increased in viscosity, about 3,500 to about 4,500 ml of dichloroethane was added to prevent gelation. After completion of the additions, the solution was allowed to continually stir for another 12 hours, and then the resultant product was stored for 48 hours at about room temperature. The desired viscosity was about 40 to about 60 cps, as measured using a Brookfield Viscometer.

Using this polymer, two solutions were made; the first containing from about 2 to about 3 percent by weight polymer in dichloroethane and the second containing from about 2 to about 3 percent by weight of the polymer and from about 2 to about 5 percent by weight fiber in dichloroethane. The fibers were dispersed throughout the polymeric solution by using a surfactant and continuous agitation.

A first glove was formed and served as a control. This glove, identified as Sample 1, Table I, did not contain any fibers. After dipping, the glove was dried at room temperature for several hours.

A second glove was formed that was made according to the teachings of the present invention. A first layer was formed that did not contain any fibers by repeatedly dipping the mold into the first solution by using standard techniques. After drying, a second layer was formed by dipping into the second solution that contained the fibers. After drying, a third layer was formed by dipping into the first solution, which did not contain any fibers.

The gloves were removed from the mold and analyzed for various physical characteristics. Table I hereinbelow sets forth the type and amount of fiber employed within the middle layer of the three layered glove, the density of the glove, which is a measure of all three layers of the glove, the glove's cut resistance, tensile strength, modulus at 500% and elongation at break. It should be understood that the samples taken for purposes of cut resistance, tensile strength, modulus at 500%, and elongation at break were taken from the palm area of the glove. It should also be understood that the cut resistance was measured in accordance with the CPP test pursuant to ASTM STP 1273 and that the mechanical properties of tensile strength, modulus at 500%, and elongation at break were analyzed in accordance with ASTM D 412.

TABLE I

| Sample | 1 | 2 |
|---|---|---|
| Fiber | — | glass fiber |
| Fiber Content (wt %) | 0 | 9.0 |
| Density of film (g/m$^2$) | 72 | 96 |
| Cut Resistance (g) | 100 | 160 |
| Mechanical Properties | | |
| Tensile Strength (MPa) | 22 | 20 |
| Modulus at 500% (MPa) | 3.0 | 5.0 |
| Elongation at Break (%) | 920 | 820 |

EXAMPLE 2

A three layered natural latex glove was formed in accordance with the present invention where the middle layer contained one or more types of fibers. Physical characteristics of this glove were analyzed and compared to the physical characteristics of a similar glove that did not contain the fibers.

Natural latex was obtained from Killian Latex, Inc. This latex contained about 35 percent by weight of a fully compounded natural rubber.

Using this latex, two solutions were made; the first containing no fiber, and the second containing fiber, as identified in Table II. The fibers were dispersed throughout the latex solution as in Example 1.

A first glove was formed and served as a control. This glove, identified as Sample 1, Table II, did not contain any fibers. The glove was formed by first dipping a glove mold into a coagulant solution that was maintained at a temperature at about 70° C. This coagulant solution is available from Killian Latex, Inc. Once removed from the coagulant solution, the mold was allowed to dry for several minutes. The mold was then dipped into the first latex solution using standard techniques. Once removed, the glove was allowed to dry at room temperature for several minutes. The glove was then dipped into a water bath for leaching. After drying, the glove was then introduced into the first latex solution. The glove was again removed, air dried, and placed in a 70° C. water bath for about two minutes. Afterwards, the glove was cured at about 105° C. for about 20 minutes.

A second glove was formed that was made according to the teachings of the present invention. A first layer was formed in a similar fashion to the first glove, including dipping the mold into a the coagulant solution, drying, placing the mold into the first latex solution, drying, placing the mold into a leach bath, and drying. A second layer was formed after dipping the mold into the second solution that contained the fibers. After drying for several minutes, a third layer was formed by using the first solution, which did not contain the fibers. After drying, the mold was placed in a water bath at around 70° C. for about two minutes and then cured at about 105° C. for about 20 minutes.

A third glove was formed that was made according to the teachings of the present invention. This third glove was formed in the same manner as the second glove discussed hereinabove. As can be seen from Table II, Sample 3, hereinbelow, the third glove contained more fiber.

The gloves were removed from the mold and analyzed for various physical characteristics. Table II hereinbelow sets forth the type and amount of fiber employed within the middle layer of the three layered glove, the density of the glove, which is a measure of all three layers of the glove, and the glove's cut resistance. It should be understood that the samples taken for purposes of cut resistance were taken from the palm area of the glove. It should also be understood that the cut resistance was measured in accordance with the CPP test pursuant to ASTM STP 1273.

TABLE II

| Sample | 1 | 2 | 3 |
|---|---|---|---|
| Fiber | — | glass fiber | glass fiber |
| Fiber Content (wt %) | 0 | 5 | 10 |
| Density of film (g/m$^2$) | 310 | 240 | 290 |
| Cut Resistance (g) | 120 | 160 | 290 |

EXAMPLE 3

A three layered polychloroprene glove was formed in accordance with the present invention where the middle layer contained one or more types of fibers. Physical characteristics of this glove were analyzed and compared to the physical characteristics of a similar glove that did not contain the fibers.

A polychloroprene latex was obtained from The Bayer Corporation under the tradename Dispercoll® C X Q 705. This latex contained about 40 percent by weight of a fully compounded polychloroprene.

Using this latex, two solutions were made; the first containing no fiber, and the second containing fiber, as identified in Table III, hereinbelow. The fibers were dispersed throughout the polymeric solution as in Example I.

A first glove formed and served as a control, this glove, identified as Sample 1, Table III, did not contain any fibers. The glove was formed by first dipping a glove mold into a coagulant solution that was maintained at a temperature at about 70° C. This coagulant solution is available from Killian Latex, Inc. Once removed from the coagulant solution, the mold was allowed to dry for several minutes. The mold was then dipped into the first latex solution by using standard techniques. Once removed, the glove was allowed to dry at room temperature for several minutes. The glove was then dipped into a water bath for leasing. After drying, the glove was then introduced into the first latex solution. The glove was again removed, air dried, and placed in a 70° C. water bath for about two minutes. Afterwards, the glove was dried in an oven at about 75-85° C. for about 50 minutes and then cured at about 115-120° C. for about 50 minutes.

A second glove was formed that was made according to the teachings of the present invention. A first layer was formed in a similar fashion to the first glove, including dipping the mold into the coagulant solution, drying, placing the mold into the first latex solution, drying, placing the mold into a leach bath, and drying. A second layer was formed after a dipping cycle in the second solution that contained the fibers. After drying for several minutes, a third layer was formed after a dipping cycle in the first solution, which did not contain the fibers. After drying, the mold was placed in a water bath at around 70° C. for about two minutes and then cured as above.

The gloves were removed from the mold and analyzed for various physical characteristics. Table III hereinbelow sets forth the type and amount of fiber employed within the middle layer of the three layered glove, the density of the glove, which is a measure of all three layers of the glove, the glove's cut resistance, tensile strength, modulus at 500% and elongation at break. It should be understood that the samples taken for purposes of cut resistance, tensile strength, modulus at 500%, and elongation at break were taken from the palm area of the glove. It should also be understood that the cut resistance was measured in accordance with the CPP test pursuant to ASTM STP 1273 and that the mechanical properties of tensile strength, modulus at 500%, and elongation at break were analyzed in accordance with ASTM D 412.

TABLE III

| Sample | 1 | 2 |
|---|---|---|
| Fiber | — | glass fiber |
| Fiber Content (wt %) | 0 | 9 |
| Density of film (g/m$^2$) | 220 | 240 |
| Cut Resistance (g) | 130 | 200 |
| Mechanical Properties | | |
| Tensile Strength (MPa) | 21 | 20 |
| Modulus at 500% (MPa) | 3.7 | 4.3 |
| Elongation at Break (%) | 765 | 730 |

EXAMPLE 4

A single layered nitrile industrial glove was formed in accordance with the present invention. Physical characteristics of this glove were analyzed and compared to the physical characteristics of a similar glove that did not contain the fibers.

A nitrile rubber latex was obtained from The BF Goodrich Company. This was a fully compounded latex. Using this latex, two solutions were made; the first containing no fiber, and the second containing fiber. The fibers were dispersed throughout the polymeric solution as in Example 1.

A first glove formed and served as a control, this glove, identified as Sample 1, Table IV, did not contain any fibers. The glove was formed by first dipping a glove mold into a coagulant solution that was maintained at a temperature at about 70° C. This coagulant solution was prepared by using about 0.01 percent Trityon X-100, about 5-10% calcium nitrate and the balance being about 95 percent ethanol. Once removed from the coagulant solution, the mold was allowed to dry for several minutes. The mold was then dipped into the first latex. Once removed, the glove was allowed to dry at room temperature for several minutes. The glove was then dipped into a leach bath that included water at about 50-60° C. Afterwards, the glove was cured at about 105° C. for about 20 minutes.

Two additional gloves were made that contained fibers. The technique for making the gloves was the same as the technique used for Sample 1, except that the second solution containing fiber was used. The third glove made, i.e., Sample 3, was thicker than Sample 2. This thickness was achieved by additional dipping into the solution.

The gloves were removed from the mold and analyzed for various physical characteristics. Table IV hereinbelow sets forth the type and amount of fiber employed within the middle layer of the three layered glove, the density of the glove, which is a measure of all three layers of the glove, and the glove's cut resistance. It should be understood that the samples taken for purposes of cut resistance were taken from the palm area of the glove. It should also be understood that the cut resistance was measured in accordance with the CPP test pursuant to ASTM STP 1273.

TABLE IV

| Sample | 1 | 2 | 3 |
|---|---|---|---|
| Fiber | — | glass fiber | glass fiber |
| Fiber Content (wt %) | 0 | 12 | 11 |
| Density of film (g/m$^2$) | 90 | 250 | 400 |
| Cut Resistance (g) | 100 | 300 | 650 |

EXAMPLE 5

A three layered copolymer glove was formed in accordance with the present invention where the middle layer contained one type of fiber. Physical characteristics of this glove were analyzed and compared to the physical characteristics of a similar glove that did not contain the fibers.

About 200 g of Kraton® G 1650 (styrene-ethylene butylene-styrene block copolymer) and about 400 g of Kraton® D1107 (styrene-isoprene-styrene block copolymer) was mixed in about 3L, of toluene. Kraton® is available from the Shell Chemical Company.

Using this polymer mixture, two solutions were made; the first containing no fiber and the second containing fiber. The fibers were dispersed throughout the polymeric solution as in Example 1.

A first glove was formed and served as a control. This glove, identified as Sample 1, Table V, did not contain any fibers. This glove was formed by using standard techniques. The glove was dried at room temperature for several hours.

A second glove was formed that was made according to the teachings of the present invention. A first layer was formed after a dipping cycle in the first solution, which did not contain any fibers. After drying for at least 20 minutes at room temperature, a second layer was formed after a dipping cycle in the second solution that contained the fibers. After drying for at least 20 minutes, a third layer was formed after a dipping cycle in the first solution, which did not contain any fibers.

The gloves were removed from the mold and analyzed for various physical characteristics. Table V hereinbelow sets forth the type and amount of fiber employed within the middle layer of the three layered glove, the density of the glove, which is a measure of all three layers of the glove, and the glove's cut resistance. It should be understood that the samples taken for purposes of cut resistance were taken from the palm area of the glove. It should also be understood that the cut resistance was measured in accordance with the CPP test pursuant to ASTM STP 1273.

TABLE V

| Sample | 1 | 2 |
|---|---|---|
| Fiber | — | glass fiber |
| Fiber Content (wt %) | 0 | 7 |
| Density of film (g/m$^2$) | 270 | 300 |
| Cut Resistance (g) | 100 | 200 |

EXAMPLE 6

Using the polyurea polymer as prepared in Example 1, several different types of fibers were used and made into a film. Table VI, hereinbelow, sets forth the types of fiber employed in each Example. It is here noted that the cut resistance was measured in inches employing a force of 150 grams. The values represent the distance a fresh blade traveled before the material was cut.

TABLE VI

| Example | Fiber | Fiber Content (wt %) | Cut Resistance (inch) | Density 9/m$^2$ |
|---|---|---|---|---|
| 1 | 0 | 0 | 0.50 | 160 |
| 2 | CRF ® | 5.3 | 1.02 | 190 |
| 3 | Kevlar ® | 8.3 | 0.62 | 160 |
| 4 | Spectra ® | 6.4 | 0.71 | 180 |
| 5 | Milled 1/16' Glass | 5.5 | 1.05 | 170 |

Thus it should be evident that the gloves and/or elastomeric films of the present invention have improved cut resistance without deleteriously impacting many of the properties of the gloves or films. The invention is particularly suited for medical and industrial uses, but is not necessarily limited thereto. Namely, it is anticipated that many molded or extruded products or films can be advantageously enhanced using the teachings of the present invention.

Based upon the foregoing disclosure, it should now be apparent that the use of the gloves and/or films described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, gloves according to the present invention are not necessarily limited to those made by dip-forming because it is anticipated that similar gloves may be formed by flocking processes. Thus, the scope of the invetion shall include all modifications and variations that may fall within the scope of the attached claims.

What is claimed is:

1. A medical glove having improved cut resistance comprising:

at least three dipped formed elastomeric layers combined to form the entire glove, the at least three elastomeric layers including an innermost layer, an outermost layer, and a middle layer, wherein the middle layer contains a three dimensional network of chopped fibers randomly dispersed throughout for enhancing the glove's cut resistance.

2. A medical glove, as set forth in claim 1, where said fibers for enhancing the glove's cut resistance are selected from the group consisting of glass fibers, steel fibers, aramid fibers, polyethylene fibers, particle filled polymeric fibers, and mixtures thereof.

3. A medical glove, as set forth in claim 2, wherein said fibers are particle filled polymeric fibers.

4. A medical glove, as set forth in claim 2, wherein said fibers are ultra high molecular weight polyethylene fibers.

5. A medical glove, as set forth in claim 1, wherein at least one layer of said at least three elastomeric layers comprises a polymer selected from the group consisting of natural rubber, polychloroprene, styrene-isoprene-styrene block copolymers, styrene-ethylene butylene-styrene block copolymers, styrene-butadiene-styrene block copolymers, polyurethane, polyurea, nitrile rubber, vinyl chloride based polymers and mixtures thereof.

6. A medical glove, as set forth in claim 5, wherein said polymer is natural latex.

7. A medical glove, as set forth in claim 5, wherein said polymer is a mixture of styrene-isoprene-styrene and styrene-ethylene butylene-styrene block copolymers.

8. A medical glove, as set forth in claim 1, wherein said glove's cut resistance is increased by at least about 20 percent by the addition of about 2 to about 20 weight percent of said fibers.

9. A medical glove, as set forth in claim 1, wherein said at least three elastomeric layers comprises a polymer that is a mixture of styrene-butadiene-styrene and styrene-isoprene-styrene block copolymers.

10. A medical glove, as set forth in claim 1, wherein said glove contains from about 2 to about 20 percent fiber based on the entire weight of the glove.

11. A medical glove, as set forth in claim 1, wherein said at least three elastomeric layers define a single layer palm thickness of the glove from about 0.08 to about 0.4 mm, a single layer finger thickness from about 0.08 to about 0.45 mm, and a single layer cuff thickness of the glove from about 0.08 to about 0.2 mm.

12. A medical glove, as set forth in claim 1, wherein the tensile strength of the glove is at least about 17 MPa, the elongation of the glove is at least about 650 percent, and the 500% modulus of the glove is less than about 7 MPa.

13. A medical glove, as set forth in claim 1, wherein the tensile strength of the glove is at least about 24 MPa, the elongation of the glove is at least about 750 percent, and the 500% modulus of the glove is less than about 5.5 MPa.

14. A medical glove, as set forth in claim 1, where said fibers have a length of from about 0.1 mm to about 5.0 mm.

15. A medical glove, as set forth in claim 1, where said fibers have a denier that is from about 1 to about 10.

16. A glove having increased cut resistance comprising:

at least one polymeric *film* layer, wherein the at least one polymeric *film* layer includes chopped fibers that are randomly dispersed therein thus forming a *fiber-containing polymeric film layer that yields a* glove having cut and puncture resistance throughout.

17. A glove, as set forth in claim 16, wherein said polymeric layer comprises a polymer selected from the group consisting of natural rubber, polychloroprene, styrene-isoprene-styrene block copolymers, styrene-butadiene-styrene block copolymers, styrene-ethylene butylene-styrene block copolymers, polyurethane, polyurea, nitrile rubber, vinyl chloride based polymers, and mixtures thereof.

18. A glove, as set forth in claim 16, wherein said fibers are selected from the group consisting of glass fibers, steel fibers, aramid fibers, polyethylene fibers, particle filled polymeric fibers, and mixtures thereof.

19. A glove, as set forth in claim 16, where a single layer palm thickness of the glove is from about 0.08 to about 0.2 mm.

20. A medical glove having improved cut resistance comprising an innermost layer, an outermost layer, and a middle layer therebetween, where the middle layer extends throughout the entire glove and includes a three dimensional network of chopped fibers randomly dispersed throughout for enhancing the cut resistance of the glove*, wherein at least one of the innermost layer and the outermost layer is a polymeric film layer*.

21. A medical glove, as set forth in claim 20, wherein each of the plurality of chopped fibers has a thickness dimension ranging from about 0.1 mm to about 0.2 mm and includes a length dimension from about 0.1 mm to about 5 mm.

22. A medical glove, as set forth in claim 20, wherein each of the plurality of chopped fibers has a denier ranging from about 1 to about 10.

*23. A medical glove according to claim 1, wherein the middle elastomeric layer includes from 70 to 98% by weight of at least one polymer.*

*24. A medical glove according to claim 23, wherein the middle elastomeric layer further includes from 2 to 30% by weight fibers.*

*25. A glove according to claim 16, wherein the polymeric layer includes from 70 to 98% by weight of at least one polymer.*

*26. A glove according to claim 25, wherein the polymeric layer further includes from 2 to 30% by weight fibers.*

*27. A flexible polymeric film having increased cut resistance comprising:*

*a flexible polymeric film layer, wherein the flexible polymeric film layer includes chopped fibers that are randomly dispersed therein thus forming a flexible polymeric film having cut and puncture resistance throughout; and*

*a flexible polymeric film layer substantially devoid of chopped fibers.*

*28. The flexible polymeric film, as set forth in claim 27, wherein the flexible polymeric layer comprises a polymer selected from natural rubber, polychloroprene, styrene-isoprene-styrene block copolymers, styrene-butadiene-styrene block copolymers, styrene-ethylene butylene-styrene block copolymers, polyurethane, polyurea, nitrile rubber, vinyl chloride based polymers, and mixtures thereof.*

*29. The flexible polymeric film, as set forth in claim 27, wherein the fibers are selected from glass fibers, steel fibers, aramid fibers, polyethylene fibers, particle filled polymeric fibers, and mixtures thereof.*

*30. The flexible polymeric film, as set forth in claim 27, wherein the fibers are particle filled polymeric fibers.*

*31. The flexible polymeric film, as set forth in claim 27, wherein the flexible polymeric film's cut resistance is increased by at least about 20 percent by the addition of about 2 to about 20 weight percent of the fibers.*

*32. The flexible polymeric film, as set forth in claim 27, wherein the tensile strength of the flexible polymeric film is at least about 17 MPa, the elongation of the flexible polymeric film is at least about 650 percent, and 500% modulus of the flexible polymer film is less than about 7 MPa.*

*33. The flexible polymeric film, as set forth in claim 27, wherein the tensile strength of the flexible polymeric film is at least about 24 MPa, the elongation of the flexible polymeric film is at least about 750 percent, and the 500% modulus of the flexible polymeric film is less than about 5.5 MPa.*

*34. The flexible polymeric film, as set forth in claim 27, wherein each of the chopped fibers has a denier ranging from about 1 to about 10.*

*35. The flexible polymeric film, as set forth in claim 27, wherein the chopped fibers have a length of from about 0.1 mm to about 5.0 mm.*

*36. A polymeric film according to claim 27, wherein the flexible polymeric layer includes from 70 to 98% by weight of at least one polymer.*

*37. A polymeric film as in claim 36, wherein the flexible polymeric layer further includes from 2 to 30% by weight fibers.*

*38. An article formed from a flexible polymeric film having increased cut resistance, the flexible polymeric film comprising:*

*a flexible polymeric film layer, wherein the flexible polymeric film layer includes chopped fibers that are randomly dispersed therein to form a flexible polymeric film having cut and puncture resistance throughout; and*

*a flexible polymeric film layer substantially devoid of chopped fibers.*

*39. An article, as set forth in claim 38, wherein the flexible polymeric layer comprises a polymer selected from natural rubber, polychloroprene, styrene-isoprene-styrene block copolymer, styrene-butadiene-styrene block copolymers, styrene-ethylene butylene-styrene block copolymers, polyurethane, polyurea, nitrile rubber, vinyl chloride based polymers, and mixtures thereof.*

*40. An article, as set forth in claim 38, wherein the fibers are selected from glass fibers, steel fibers, aramid fibers, polyethylene fibers, particle filled polymeric fibers, and mixtures thereof.*

*41. An article according to claim 38, wherein the flexible polymeric layer includes from 70 to 98% by weight of at least one polymer.*

*42. An article according to claim 41, wherein the flexible polymeric layer further includes from 2 to 30% by weight fibers.*

* * * * *